United States Patent
Blight (10) Patent No.: US 9,699,495 B2
(45) Date of Patent: *Jul. 4, 2017

(54) APPARATUS, SYSTEMS AND METHODS FOR STORING PROGRAM EVENTS IN AN ENHANCED HISTORY BUFFER

(71) Applicant: EchoStar UK Holdings Limited, Steeton, Keighley (GB)

(72) Inventor: Andrew Blight, Pontefract (GB)

(73) Assignee: EchoStar UK Holdings Limited, Steeton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,013

(22) Filed: Oct. 3, 2016

(65) Prior Publication Data

US 2017/0026682 A1     Jan. 26, 2017

Related U.S. Application Data

(63) Continuation of application No. 14/604,469, filed on Jan. 23, 2015, now Pat. No. 9,462,217, which is a
(Continued)

(51) Int. Cl.
| | |
|---|---|
| *H04N 5/76* | (2006.01) |
| *H04N 9/80* | (2006.01) |
| *H04N 21/433* | (2011.01) |
| *H04N 21/44* | (2011.01) |
| *H04N 21/4147* | (2011.01) |

(Continued)

(52) U.S. Cl.
CPC ... *H04N 21/4147* (2013.01); *G06F 17/30858* (2013.01); *G11B 27/28* (2013.01); *H04N 5/76* (2013.01); *H04N 5/775* (2013.01); *H04N 5/781* (2013.01); *H04N 21/4263* (2013.01); *H04N 21/4331* (2013.01); *H04N 21/4334* (2013.01);
(Continued)

(58) Field of Classification Search
CPC ...... H04N 21/4147; H04N 5/76; H04N 5/775; H04N 5/781; H04N 21/4331; H04N 21/4263; H04N 21/42692; H04N 21/4335; H04N 21/43622; H04N 21/44004
See application file for complete search history.

(56) References Cited

U.S. PATENT DOCUMENTS

| 6,971,121 B2 | 11/2005 | West et al. |
| 2002/0166123 A1 | 11/2002 | Schrader et al. |

(Continued)

FOREIGN PATENT DOCUMENTS

WO    03/081915 A1    10/2003

*Primary Examiner* — Gelek W Topgyal
(74) *Attorney, Agent, or Firm* — Lowe Graham Jones PLLC (57) ABSTRACT

Enhanced history buffer systems and methods are operable to temporarily store program content for program events. An exemplary embodiment receives program content corresponding to each of the plurality of program events, generates a unique discrete program content file in the enhanced history buffer for each of the plurality of program events, and stores the received program content for each of the plurality of program events in the associated one of the discrete program content files. Each discrete program content file begins at a known starting location in the enhanced history buffer and ends at a known ending location in the enhanced history buffer.

18 Claims, 2 Drawing Sheets

Related U.S. Application Data continuation of application No. 13/663,249, filed on Oct. 29, 2012, now Pat. No. 8,942,538, which is a continuation of application No. 12/797,050, filed on Jun. 9, 2010, now Pat. No. 8,301,008.

(51) Int. Cl.
| | |
|---|---|
| *H04N 21/426* | (2011.01) |
| *H04N 5/781* | (2006.01) |
| *H04N 5/775* | (2006.01) |
| *H04N 21/4627* | (2011.01) |
| *G11B 27/28* | (2006.01) |
| *G06F 17/30* | (2006.01) |
| *H04N 21/845* | (2011.01) |

(52) U.S. Cl.
CPC ... *H04N 21/44004* (2013.01); *H04N 21/4627* (2013.01); *H04N 21/845* (2013.01)

(56) References Cited

U.S. PATENT DOCUMENTS

| | | |
|---|---|---|
| 2002/0168178 A1* | 11/2002 | Rodriguez .............. H04N 5/76 386/293 |
| 2003/0016304 A1 | 1/2003 | Norsworthy et al. |
| 2003/0106064 A1 | 6/2003 | Plourde, Jr. |
| 2003/0108331 A1 | 6/2003 | Plourde, Jr. et al. |
| 2003/0110514 A1 | 6/2003 | West et al. |
| 2003/0206719 A1 | 11/2003 | Bumgardner et al. |
| 2003/0210898 A1 | 11/2003 | Juen et al. |
| 2004/0028042 A1 | 2/2004 | Srinivasan et al. |
| 2004/0255336 A1 | 12/2004 | Logan et al. |
| 2005/0251835 A1 | 11/2005 | Scott, III et al. |
| 2008/0216120 A1 | 9/2008 | Knudson et al. |
| 2009/0067814 A1 | 3/2009 | Douzono |
| 2009/0222854 A1 | 9/2009 | Cansler et al. |
| 2010/0021142 A1 | 1/2010 | Minami et al. |
| 2010/0115575 A1 | 5/2010 | Yu et al. |

* cited by examiner

APPARATUS, SYSTEMS AND METHODS FOR STORING PROGRAM EVENTS IN AN ENHANCED HISTORY BUFFER

PRIORITY CLAIM

This patent application is a Continuation of U.S. patent application Ser. No. 14/604,469, filed Jan. 23, 2015, published as U.S. Publication No. 2015/0139611, entitled "APPARATUS, SYSTEMS AND METHODS FOR STORING PROGRAM EVENTS IN AN ENHANCED HISTORY BUFFER," and issued as U.S. Pat. No. 9,462,217 on Oct. 4, 2016, which is a Continuation of U.S. patent application Ser. No. 13/663,249, filed Oct. 29, 2012, published as U.S. Publication No. 2013/0051762, entitled "APPARATUS, SYSTEMS AND METHODS FOR STORING PROGRAM EVENTS IN AN ENHANCED HISTORY BUFFER," and issued as U.S. Pat. No. 8,942,538 on Jan. 27, 2015, which is a Continuation of U.S. patent application Ser. No. 12/797,050, filed Jun. 9, 2010, published as U.S. Publication No. 2011/0307914, entitled "APPARATUS, SYSTEMS AND METHODS FOR STORING PROGRAM EVENTS IN AN ENHANCED HISTORY BUFFER," and issued as U.S. Pat. No. 8,301,008 on Oct. 30, 2012, the contents of all of which are herein incorporated by reference in their entirety.

BACKGROUND

Media devices, such as a set top box, are configured to receive numerous program content streams from a content service provider. The program content streams are provided over a content delivery system. Examples of content delivery systems include a satellite content distribution system or a cable content distribution system.

A user may configure their media device to tune to particular program content of interest. Program events in the selected program content may then be presented on a display and/or stored in a digital video recorder (DVR) or the like.

Media devices typically include a "history buffer" that temporarily stores currently received portions of the currently presented program event. The history buffer allows a user to pause and/or rewind presentation of the program event. However, the amount of stored program content in the history buffer is limited by some predefined amount since the capacity of the history buffer is limited.

Since storage capacity of the history buffer is limited, the user can only rewind the program event by a limited duration. Beyond that duration, the program event will not be available (as it has likely been overwritten with the more recently received portions of the program event). Further, presentation of the program event may only be paused for a limited duration because of the limited storage capacity of the history buffer. At some point, the paused portion of the program event will be lost as more currently received program content overwrites the paused portion of the program event.

If the user retunes their media device to a different program event, the content of the history buffer is also lost. The user cannot return to the previous program event and view previously presented portions of the program event. Further, if the program event concludes and a new program event begins, the concluding program event is lost. The user is not able to rewind back to the previous program event. Also, when the media device is turned off, the content of the history buffer may be lost.

Typically, the user is not able to save any portion of the program content saved in the history buffer because the DVR function is separate from the temporary storage function provided by the history buffer. Even if the media device is configured to save content from the history buffer, the content must be reprocessed and then saved into the DVR.

Digital rights management (DRM) information is typically not stored in the history buffer. Thus, even if portions of the program event content stored in the history buffer could be reconfigured for storage into the DVR, DRM violations may occur. Similarly, parental control setting information is not stored in the history buffer. If portions of the content stored in the history buffer are retrieved and stored into the DVR, parental control violations may occur.

Accordingly, there is a need in the arts to enhance storage and access to history buffer program event content.

SUMMARY

Systems and methods of temporarily storing program events are disclosed. An exemplary embodiment receives program content corresponding to each of the plurality of program events, generates a unique discrete program content file in the enhanced history buffer for each of the plurality of program events, and stores the received program content for each of the plurality of program events in the associated one of the discrete program content files. Each discrete program content file begins at a known starting location in the enhanced history buffer and ends at a known ending location in the enhanced history buffer.

BRIEF DESCRIPTION OF THE DRAWINGS

Preferred and alternative embodiments are described in detail below with reference to the following drawings.

DETAILED DESCRIPTION

Figure 1:
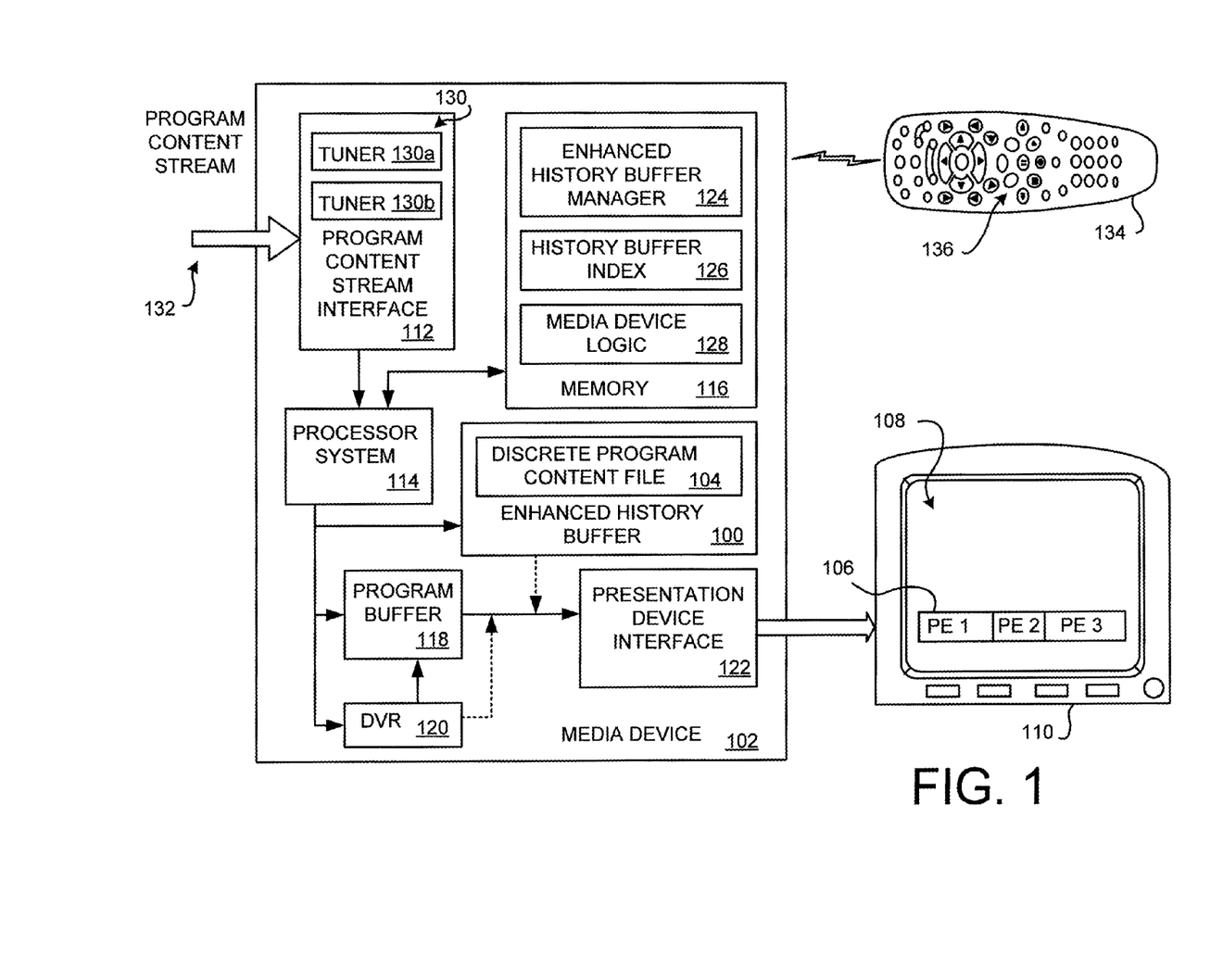
FIG. 1 is a block diagram of an embodiment of an enhanced history buffer implemented in a media device.

FIG. 1 is a block diagram of an embodiment of an enhanced history buffer 100 implemented in a media device 102, such as, but not limited to, a set top box (STB). Embodiments of the enhanced history buffer 100 may be implemented in other media devices, such as, but not limited to, stereos, radios, televisions (TVs), digital video disc (DVD) players, digital video recorders (DVRs), game playing devices, or personal computers (PCs) that are configured to temporarily save currently received program event content.

Embodiments of the enhanced history buffer 100 save the program content of currently presented program events into unique discrete program content files 104. Each discrete program content file 104 has a defined start location and a defined end location in the enhanced history buffer 100. When a program event change is detected, the recording of the current program event ends and its respective discrete program content file 104 is closed. A new discrete program content file 104 is generated for storing the program content of the next program event in the enhanced history buffer 100.

Non-limiting examples of a program event change include a conclusion of the program event, a change to a different program event, or an end of presentation of the current program event. Ending presentation of the program event may occur when the user turns off the media device 102, switches to a different media source such as a digital video disk (DVD) player, or retrieves a previously recorded program event from the media device DVR.

In an exemplary embodiment, each discrete program content file 104 is initially identified as a temporary file. When the memory storage capacity of the enhanced history buffer 100 becomes fully utilized, then the remaining portion of the currently generated discrete program content files 104 may be stored into the enhanced history buffer 100 by overwriting, deleting, erasing, or otherwise replacing the oldest one of the plurality of discrete program content files 104 that are identified as temporary files.

In some embodiments, selected discrete program content files 104 may be saved on a permanent, or semi-permanent, basis. For example, a temporary discrete program content file 104 may be selectively designated as a saved discrete program content file 104. When the memory storage capacity of the enhanced history buffer 100 becomes fully utilized, then newly generated discrete program content files 104 will not overwrite, delete, erase, or otherwise replace the discrete program content files 104 that are identified as saved files.

A user may, at their convenience, rewind back to any program event that is stored in a discrete program content file 104. For example, a user may wish to rewind back past the last program event change, or rewind back past multiple program event changes, to access a particular program event of interest. Embodiments can access the program event of interest since each one of the plurality of program events are readily identifiable by their attributes saved in their respective discrete program content file 104.

In selected embodiments, a history buffer guide 106 may be presented on a display 108 of a media presentation device 110, such as the exemplary television, to assist the user to select a program event of interest that has been stored in one of the discrete program content files 104. In an exemplary embodiment, the history buffer guide 106 is a banner type menu that is interactive with the user.

In some embodiments, the history buffer guide 106 is a graphical user interface (GUI) that presents a menu of a combination of text and symbols to indicate program event viewing choices that may be selected by the user. The user, via a remote control 134, may "scroll" or "navigate" about the history buffer guide 106 to select a program event of interest that has been stored in the enhanced history buffer 100. When the user highlights the portion of the enhanced history buffer 100 corresponding to a program event of interest, the user may actuate one or more actuators 136 on their remote control 134 to cause the media device 102 to present the selected program event of interest.

For example, the user may understand that the portion of the history buffer guide 106 denoted as "PE 1" corresponds to the current program event, and that program events denoted as "PE 2" and "PE 3" correspond to previously received program events. If the user selects the "PE 3" portion of the history buffer guide 106, that particular previously saved program event will be retrieved from the enhanced history buffer 100 and is presented to the user. Presentation may begin at the start of the selected program event. In other embodiments, the presentation may begin at the end of the selected program event.

The relative length of each labeled portion of the history buffer guide 106 may correspond to the duration of the saved program event in that particular discrete program content file 104. For example, the "PE 2" portion of the history buffer guide 106 is shorter than the "PE 1" and "PE 2" portions. The user would understand that the duration of the program event in the "PE 2" portion of the enhanced history buffer 100 is less than the durations of the program events stored in the "PE 1" and "PE 2" portions.

Alternatively, or additionally, program events that have been saved into the enhanced history buffer 100 may be indicated on a conventional electronic program guide (EPG). For example, an icon or text message may be added into the EPG to indicate that at least a portion of a particular program event has been saved into the enhanced history buffer 100.

The functionality of the non-limiting exemplary media device 102, here a set top box, is now broadly described. The media device 102 comprises a program content stream interface 112, a processor system 114, a memory 116, a program buffer 118, an optional digital video recorder (DVR) 120, a presentation device interface 122, and the enhanced history buffer 100. The memory 116 comprises portions for storing the enhanced history buffer manager 124, an optional history buffer index 126, and the media device logic 128. The program content stream interface 112 includes one or more tuners 130 configured to selectively tune to a particular content stream that provides a program event of interest. The exemplary media device 102 has two tuners 130a and 130b. Other media devices may include some, or may omit some, of the above-described media processing components. Further, additional components not described herein may be included in alternative embodiments.

The exemplary media device 102 is configured to perform a variety of functions on received media. The general functionality of the media device 102 is controlled by the media device logic 128 which is retrieved and executed by the processor system 114.

The enhanced history buffer 100 is managed by the enhanced history buffer manager 124 which is retrieved and executed by the processor system 114. In some embodiments, the media device logic 128 and the enhanced history buffer manager 124 may be integrated together. In other embodiments, the media device logic 128 and the enhanced history buffer manager 124 may reside in different memory media.

A program content provider provides program content in a program content stream 132. Multiple program content streams 132 may be multiplexed together in a transport channel. The transport channels with the program content streams 132 are communicated to the media device 102 from a media system sourced from a remote head end facility (not shown) operated by a content service provider. Non-limiting examples of such media systems include satellite systems, cable system, and the Internet. For example, if the content service provider provides programming via a satellite-based communication system, the media device 102 is configured to receive one or more broadcasted satellite signals detected by an antenna (not shown). Alternatively, or additionally, the program content streams 132 may be received from one or more different sources, such as, but not limited to, a cable system, a radio frequency (RF) communication system, or the Internet.

The program content streams 132 are received by the program content stream interface 112. One or more tuners 130a, 130b selectively tune to one of the program content streams 132 in accordance with instructions received from the processor system 114. Alternatively, or additionally, the program content stream interface 112 may comprise an Internet connection that receives one or more content streams 132 from the Internet.

The processor system 114, based upon a user instruction that specifies a program event of interest, parses out program content received from the tuners 130. In an exemplary embodiment, user instructions may be communicated to the media device 102 from a remote control 134. The user actuates one or more of the controllers 136 on the remote control 134 to generate the user instructions. The user instructions may be wirelessly transmitted from the remote control 134 to the media device 102 using a suitable wireless signal, such as an infrared signal or a radio frequency (RF) signal.

The specified program of interest is then assembled into a stream of video and/or audio information which is stored by the program buffer 118 such that the program content is streamed out to the media presentation device 110, via the presentation device interface 122. Alternatively, or additionally, the parsed out program content may be saved into the DVR 120 for later presentation.

As the processor system 114 parses out the program content received from the tuners 130, the program event of interest is saved into a discrete program content file 104. In an exemplary embodiment, the program event is saved into its unique discrete program content file 104 concurrently as the stream of video and/or audio information is communicated to the media presentation device 110.

In an exemplary embodiment, the optional history buffer index 126 contains information pertaining to the program events stored in the plurality of discrete program content files 104. The processing system 114 accesses the information in the history buffer index 126 to generate the history buffer guide 106.

Figure 2:
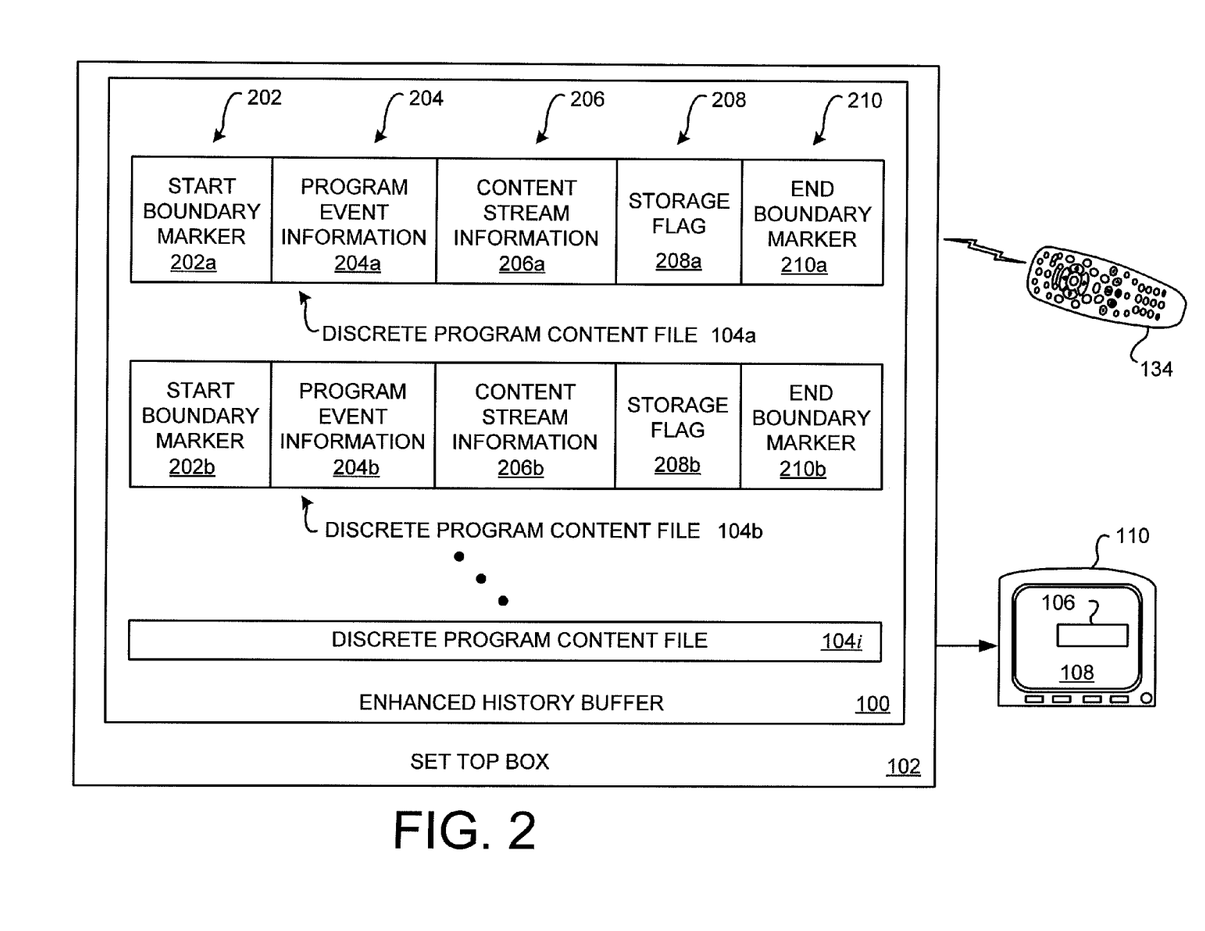
FIG. 2 is a block diagram of an embodiment of an enhanced history buffer.

FIG. 2 is a block diagram of an example embodiment of the enhanced history buffer 100. The program content associated with the currently presented program event is saved into its unique discrete program content file 104. As a program event change occurs, a new unique discrete program content file 104 is generated for the new program event. The program content of the new program event is saved into its unique discrete program content file 104 for as long as that particular new program event is presented. Accordingly, the enhanced history buffer 100 contains a plurality of discrete program content files 104a-104l.

Each discrete program content file 104 includes a start boundary marker 202, program event information 204, content stream information 206, an optional storage flag 208, and an end boundary marker 210. The start boundary marker 202 identifies the starting location of its respective discrete program content file 104 in the enhanced history buffer 100. The end boundary marker 210 identifies the ending location of its respective discrete program content file 104 in the enhanced history buffer 100.

The program event information 204 contains selected information of interest pertaining to the stored program event. Program event information may include, but is not limited to, a title of the program event, a source identifier, a start time, an end time, digital rights management (DRM) information, and/or a presentation date. Any suitable information of interest may reside in the program event information 204.

The content stream information 206 portion of the discrete program content file 104 contains the program event content comprised of video and/or audio information. The amount of memory capacity used for the content stream information 206 is variable so as to provide sufficient capacity to store program content during the duration of the currently presented program event.

In practice, the media device 102 tunes one of the tuners 130a or 130b to a particular program content stream 132 based on a user selection of a program event of interest. The selected program event may then be communicated to the media presentation device 110, such as the exemplary television. The video portion of the program event is presented on the display 108 and the audio portion of the program event is presented on the television speakers or on another audio device (not shown).

As the media device 102 is processing the program content stream 132 for communication to the media presentation device 110, the program content is stored into its respective discrete program content file 104. Storage of the program event into its respective discrete program content file 104 begins by defining or selecting a location in the memory medium where the streaming program content for the presented program event will begin to be stored. A suitable identifier is stored into the start boundary marker 202 portion of the discrete program content file 104 to denote or otherwise mark the beginning location of the discrete program content file 104 in the enhanced history buffer 100. Accordingly, the starting location in the enhanced history buffer 100 where the discrete program content file 104 begins is known or is determinable.

Program event information pertaining to the currently received program event is retrieved from the program content stream 132. Selected program event information is stored into the program event information 204 portion the respective discrete program content file 104.

Video and/or audio information of the streaming program content for the presented program event is then stored into the content stream information 206 portion of the respective discrete program content file 104. Storing of the video and/or audio information continues until a program event change occurs.

When a program event change is detected, storage of the video and/or audio information of the streaming program content for the program event ends. A suitable identifier is then stored into the respective end boundary marker 210 to mark or otherwise denote the ending location of its respective discrete program content file 104. Accordingly, the ending location of the discrete program content file 104 is known or is determinable.

Program event changes may be detected based upon instructions received from the remote control 134, such as when the user changes program channels, turns off the media device 102, or causes the media device 102 to receive programming from another source, such as an external DVD player. Alternatively, program event changes may be detected by information in the received program content stream 132, such as when a program event concludes or when a program event begins. Any suitable process for detecting program event changes may be used by the various embodiments.

In an exemplary embodiment, the optional storage flag 208 is initially set to a default value that indicates that the discrete program content file 104a is a temporary file. Accordingly, when the memory storage capacity of the enhanced history buffer 100 becomes fully utilized, an older temporary program event in the discrete program content file 104 may be overwritten as needed to accommodate storage of newer program events.

In embodiments that do not employ the storage flag 208 feature, all discrete program content files 104 are temporary and will be overwritten, deleted, or otherwise erased to provide storage for the program content of the currently presented program event. In such embodiments, if the user wishes to save a program event stored in a temporary discrete program content file 104, the program event may be transferred to another medium, such as the DVR 120.

When a program event change next occurs, the new program event is similarly processed and saved into a new discrete program content file 104. Accordingly, a starting location for the new discrete program content file 104 is saved into its respective start boundary marker 202, program event information for the new program event is saved into its respective program event information 204, and the video and/or audio information of the new program event is saved into its respective content stream information 206. When a next program event change occurs, the end of that program event is determined and the ending location is saved into its respective end boundary marker 210.

In practice, when a user wishes to "pause" the program event, the current video information is paused such that a still image of the current location of the program event is presented on the display 108 of the media presentation device 110. Presentation of audio information is also halted. However, the program content for the presented program event is still being received in the tuned program content stream 132. The streaming video and/or audio information that is being received is saved into the content stream information 206 of the unique discrete program content file 104 for that particular program event. When the user wishes to resume presentation of the program event, the stored video and/or audio information starting from the paused point in the program event may be retrieved from the content stream information 206 for the continued presentation of the program event.

In an exemplary embodiment, when a user wishes to "rewind" back to a previously presented point in the program event, the stored content stream information 206 is accessed in a reverse direction and is presented to the user such that the video information appears to be in slow or fast reverse motion. When the user recognizes a previously presented point of interest in the program event, then the user can request that presentation of the program event be resumed from that point of interest. Similarly, a user may wind forward through the discrete program content file 104 such that the video information appears to be in slow or fast forward motion.

Some embodiments may be configured to "jump" back through the stored program event to the beginning of the recording of the program event. Here, since the beginning location of the content stream information 206 is determinable based on the information in the start boundary marker 202, the beginning of the recorded program event may be located in the enhanced history buffer 100. Alternatively, or additionally, some embodiments may be configured to "jump" back through the stored program event by defined increments. Some embodiments may be configured to "jump" back to program flags that may be embedded into the stored program event information. Some embodiments may be configured to "jump" forward through the stored program event to the end of the recording of the program event.

The user, in some instances, may wish to "jump" back to view previous saved program events. For example, the user may wish to review presentation of the program event that they were watching prior to the most recent program event change. One or more of the controllers of the remote control 134 may be configured to "jump" back to the beginning of the prior program event. Here, the location of the prior content stream information 206 is determinable based on the information in its start boundary marker 202. The beginning of the prior program event may be accessed and presented on the media presentation device 110. Alternatively, or additionally, some embodiments may be configured to "jump" back to the end of the prior program event based on the information stored in the end boundary marker 210. The user may then rewind back through the prior program event and/or through the stored program event by defined increments or to the start of the prior program event.

Additionally, the user may wish to "jump" back to even earlier saved program events. The location of the content stream information 206 for any previously stored program event (that has not yet been overwritten by more recent program events) is determinable based on the information in its respective start boundary marker 202 or end boundary marker 210. Accordingly, the beginning or end of any recorded program event may be accessed and presented on the media presentation device 110.

The storage flag 208 manages the type of storage, temporary or permanent, applied to that particular discrete program content file 104. If the user wishes to save one or more of the stored program events on a permanent basis (i.e., non-temporary basis), the user may simply change the status of the storage flag 208 to "flag" that stored program event of interest for permanent saving. When the storage capacity of the enhanced history buffer 100 becomes fully utilized such that earlier stored discrete program content files 104 are overwritten by a currently presented program event, any discrete program content files 104 flagged for permanent storage will not be overwritten. In some embodiments, the flagged discrete program content file 104 may be automatically moved, or may be selectively moved, to another storage medium so as to maintain the storage capacity of the enhanced history buffer 100. In an exemplary embodiment, the flagged discrete program content file 104 is moved into the DVR 120.

In an alternative embodiment, certain types of program event changes do not cause an ending of the recording of the prior program event. For example, the user may select a new program event that is available on a different program content stream. In embodiments having two or more tuners 130 (FIG. 1), the change to the different content stream 132 is implemented by having the currently unused tuner 130 tune to the selected program content stream 132 such that the new program event is presented. Since the other tuner 130 is still tuned to and is receiving the program content for the prior presented program event, storage of the program content for the prior presented program event into the content stream information 206 of its respective discrete program content file 104 may continue.

In the above exemplary embodiment, the transition point where the change from the prior program event to the new program event occurred may be marked or otherwise identified in the start boundary marker 202, the end boundary marker 210, in an intermediate boundary marker (not shown), or in another suitable location in the discrete program content file 104. Thus, if the user wishes to return to the prior program event, presentation can be resumed at the point where the user initiated the program event change. Alternatively, presentation of the prior program can resume at the current real-time presentation of prior program event.

Further, since the other tuner 130 is still receiving the new program event, storage of the program content for the new program event may continue. Accordingly, the user can return to the new program event at any desired time.

In this embodiment, the user may access two concurrently received program events by selectively "toggling" between the different program events since each of the tuners 130*a* and 130*b* are independently tuned to one of the program events. For example, assume that the viewer is interested in viewing a first football match that is being received by the tuner 130*a* and is also interested in viewing a second football match that is being received by the second tuner 130b. The user may selectively toggle between the two different football matches and view particular plays that are of interest. Both football matches are being saved into unique discrete program content files 104.

Some embodiments have a fast forward and/or fast rewind feature that allows a user to increase the speed of presentation of the video information in the forward or reverse directions. In the example above, the user could fast forward to a play of interest in the first match, and then switch over to the second match and fast forward or fast rewind to view a play of interest in the second match. By selectively toggling between the two matches, and/or by using the fast forward or fast rewind features, the user can selectively view the two different football matches.

Some embodiments may be configured to present stored video information in a selected discrete program content file 104 using a picture in picture (PIP) mode, a picture over picture (POP) mode, split screen mode, or other suitable dual picture mode. In the football match example above, both football matches can be concurrently viewed using a dual screen mode. The user may selectively access the video information and/or the audio information of either football match since both football matches are being recorded into their respective discrete program content files 104.

Some media devices may have more than two tuners 130. In such media devices 102, the video information for a plurality of program events may be concurrently presented on a display using a suitable multi-image presentation format, such as PIP, POP or a mosaic or tile pattern of images. For each of the currently received program events, or selected ones of the program events, a unique discrete program content file 104 may be generated wherein the program events may be individually saved.

Some media devices 102 may be configured to receive a program event from another device, such as but not limited to, a DVD player that is communicatively coupled to the media device 102. Program events received from these other devices may be stored into a discrete program content file 104.

The recorded program events stored in the discrete program content files 104 may be managed in accordance with applicable DRM rules. For example, if the program event is a new release movie that has a DRM rule permitting storage for a predefined duration, a limited time, and/or a predefined number of presentations, then the media device 102 can define access privileges to the stored program event in accordance with the DRM rule.

Further, information used to grant access privileges to a stored program event in accordance with parental control setting information may be included in the discrete program content file 104. Thus, if an unauthorized user attempts to access the discrete program content file 104 subject to parental control rules, access can be denied and/or controlled in accordance with the applicable parental control rules. Alternatively, the program event information 204 may be used to define access privileges in accordance with current parental control information settings.

The exemplary order of the start boundary marker 202, the program event information 204, the content stream information 206, the optional storage flag 208, and the end boundary marker 210 may be configured differently in alternative embodiments. For example, the storage flag 208 may be located just after the start boundary marker 202 in an alternative embodiment. In another embodiment, the storage flag 208 may be included as part of the program event information 204.

In alternative embodiments, various information pertinent to a particular stored program event may be separately stored in the discrete program content file 104 in a suitable location. For example, DRM and/or parental control information may be separately stored from the program event information 204.

It should be emphasized that the above-described embodiments of the enhanced history buffer 100 are merely possible examples of implementations of the invention. Many variations and modifications may be made to the above-described embodiments. All such modifications and variations are intended to be included herein within the scope of this disclosure and protected by the following claims.

The invention claimed is:
1. A media device, comprising:
 a program content stream interface configured to receive at least one program content stream, wherein the program content stream comprises video and audio content of at least one of a plurality of broadcasting program events;
 an enhanced history buffer configured to store a plurality of discrete program content files, wherein each discrete program content file comprises:
  a first boundary marker portion configured to store information that identifies starting locations of each of the plurality of discrete program content files that are stored in the enhanced history buffer;
  at least one content stream information portion configured to store at least the video and audio content of a currently presenting portion of one of a plurality of program events being received at the media device in the program content stream, wherein the content stream information portion follows after the first boundary marker portion in the discrete program content file; and
  a second boundary marker portion configured to store information that identifies one of an ending location and a transition point location of each of the plurality of discrete program content files that are stored in the enhanced history buffer, wherein the second boundary marker portion follows after the content stream information portion in the discrete program content file; and
 a processor system, wherein the processor system is configured to:
  generate a first discrete program content file that is one of the plurality of discrete program content files, wherein the first discrete program content file is generated in response to a received first program event change initiated by a user who is using the media device to present a first program event, and wherein the first program event change corresponds to a change from presentation of the first program event to presentation of a second program event;
  store in the first boundary marker portion of the first discrete program content file information that identifies a starting location of the storage of the first discrete program content file in the enhanced history buffer;
  store a portion of at least the video and audio content of the currently presenting second program event into the content stream information portion of the first discrete program content file;
  detect a second program event change initiated by the user, wherein the second program event change corresponds to a change from the currently presented second program event to one of the first program event or a third program event; and wherein the processor system, in response to detecting the second program event change, is further configured to:
store in the second boundary marker portion of the first discrete program content file information that identifies one of an ending location of the storage of the first discrete program content file in the enhanced history buffer or a transition point location that identifies a transition location of the first discrete program content file corresponding to the second program event change.

2. The media device of claim 1, wherein the processor system, in response to detecting the second program event change, is further configured to:
generate a second discrete program content file that is one of the plurality of discrete program content files;
store in the first boundary marker portion of the second discrete program content file information that identifies a starting location of the storage of the second discrete program content file in the enhanced history buffer; and
store a portion of at least the video and audio content of the currently presenting one of the first program event or the third presented program event into the content stream information portion of the second discrete program content file.

3. The media device of claim 2, wherein the processor system is further configured to:
detect a third program event change corresponding to a change from the currently presented one of the first program event or the third presented program event; and
store in the end boundary marker portion of the second discrete program content file information that identifies one of an ending location of the storage of the second discrete program content file in the enhanced history buffer or a transition point location that identifies a transition location of the second discrete program content file corresponding to the third program event change.

4. The media device of claim 1, wherein the first program event is received in a first program content stream, wherein the second program event is received in a second program content stream that is different from the first program content stream, wherein the third program event is received in a third program content stream that is different from the first program content stream and the second program content stream, and wherein the program content stream interface comprises:
a single tuner that is configured to receive only one of a plurality of program content streams that each include at least one program event, wherein the single tuner must retune from receiving the second program content stream with the second program event to receive one of the first program content stream with the first program event or the third program content stream with the third program event in response to the received second program event change initiated by the user who is using the media device,
wherein the processor system ends the storing of the portion of the currently presenting second program event in the content stream information portion of the first discrete program content file in response to detecting the second program event change, and
wherein the processor system stores in the second boundary marker portion of the first discrete program content file information that identifies the ending location of the storage of the first discrete program content file in the enhanced history buffer.

5. The media device of claim 1, wherein the first program event is received in a first program content stream, wherein the second program event is received in a second program content stream that is different from the first program content stream, wherein the third program event is received in a third program content stream that is different from the first program content stream and the second program content stream, wherein the content stream information portion of the first discrete program content file is a first content stream information portion, and wherein the program content stream interface comprises:
at least a first tuner and a second tuner,
wherein the first tuner and the second tuner are each configured to receive only one of a plurality of program content streams that each include at least one program event,
wherein the first tuner, prior to the second program event change, is tuned to receive the first program content stream with the first program event,
wherein the second tuner is retuned to receive one of the first program content stream with the first program event or the third program content stream with the third program event in response to the received second program event change initiated by the user who is using the media device,
wherein the processor system ends the storing of the portion of the currently presenting second program event in the first content stream information portion of the first discrete program content file in response to detecting the second program event change,
wherein the processor system stores in the second boundary marker portion of the first discrete program content file transition point location information that identifies a location of an end of the first content stream information portion of the first discrete program content file in the enhanced history buffer at the time of the second program event change,
wherein the processor system continues the storing of the currently received second program event in a second content stream information portion of the first discrete program content file in response to detecting the second program event change, and
wherein the second content stream information portion follows the second boundary marker portion.

6. The media device of claim 5, wherein the processor system is further configured to:
generate a second discrete program content file that is one of the plurality of discrete program content files, wherein the second discrete program content file is generated in response to the received second program event change initiated by the user;
store in the first boundary marker portion of the second discrete program content file a first boundary marker that identifies a starting location of the storage of the second discrete program content file in the enhanced history buffer; and
store a portion of at least the video and audio content of the currently presenting one of the first program event or the third program event into the content stream information portion of the second discrete program content file.

7. The media device of claim 5, wherein the processor system is further configured to:

detect a third program event change initiated by the user that is detected after the second program event change, wherein the third program event change corresponds to a change from the currently presented one of the first program event or the third program event back to presentation of the second program event; and retrieve the portion of the second program event that has been stored into the second content stream information portion of the first discrete program content file, wherein presentation of the second program event resumes at a location in the second program event that corresponds to the file transition point location information stored in the second boundary marker portion of the first discrete program content file.

8. The media device of claim 5, wherein the processor system is further configured to:

detect a conclusion of a broadcast of the second program event;

end the storing of the currently received second program event in the second content stream information portion of the first discrete program content file in response to detecting the conclusion of the broadcast of the second program event; and store in a third boundary marker portion of the first discrete program content file the information that identifies the ending location of the storage of the first discrete program content file in the enhanced history buffer.

9. The media device of claim 1, further comprising:

a presentation device interface communicatively coupled to the enhanced history buffer, wherein the presentation device interface communicatively couples the media device to a media presentation system that presents the program events received from the enhanced history buffer; and a digital video recorder (DVR) that selectively stores one or more of the plurality of program events received at the program content stream interface.

10. The media device of claim 9, wherein the DVR provides the second program event that is stored in the first discrete program content file in response to the first program event change.

11. The media device of claim 1, further comprising:

a presentation device interface, wherein the presentation device interface communicatively couples the media device to a media presentation system that presents the program events received from the enhanced history buffer a digital video recorder (DVR) communicatively coupled to the presentation device interface, wherein the DVR selectively stores one or more of the plurality of program events received at the program content stream interface, wherein the enhanced history buffer is implemented in a portion of the DVR.

12. The media device of claim 1, wherein each discrete program content file further comprises:

a storage flag portion configured to store a flag indicating a storage type for the discrete program content file, wherein the flag is set to one of:

a first value that indicates that the discrete program content file is a temporary file that can be erased, deleted or overwritten in the future; and a second value that indicates that the discrete program content file is a permanent file that cannot be erased, deleted or overwritten in the future.

13. The media device of claim 12, wherein the processor system is further configured to:

detect a first user command that changes the flag from the first flag value to the second flag value such that the discrete program content file becomes permanent and cannot be erased, deleted or overwritten in the future; and detect a second user command that changes the flag from the second flag value to the first flag value such that the discrete program content file becomes temporary and can be erased, deleted or overwritten in the future.

14. The media device of claim 12, wherein the processor system is further configured to:

initially set the flag to the first flag value such that the discrete program content file becomes temporary and can be erased, deleted or overwritten in the future; and detect, after the flag has been initially set to the first flag value, a first user command that changes the flag from the first flag value to the second flag value such that the discrete program content file becomes permanent and cannot be erased, deleted or overwritten in the future.

15. A media device that presents broadcasting program events to a user, comprising:

a program content interface that receives at least a broadcast of a first program event and a second program event, an enhanced history buffer; and a processor system that is configured to:

store a portion of the first program event in a first discrete program content file of the enhanced history buffer, wherein the first discrete program content file begins with a first start boundary marker that identifies a known first start location in the enhanced history buffer;

stream the stored portion of the first program event out from the enhanced history buffer, wherein the streaming portion of the first program event is then presented to the user of the media device;

detect a program event change, wherein the program event change corresponds to a request from the user to a change presentation from the first program event to the second program event;

end the storing of the portion of the first program event in the first discrete program content file of the enhanced history buffer in response to detecting the program event change, wherein a first end boundary marker that identifies a known first end location in the enhanced history buffer is added into the first discrete program content file;

store a portion of the second program event in a second discrete program content file of the enhanced history buffer in response to detecting the program event change, wherein the second discrete program content file begins with a second start boundary marker that identifies a known second start location in the enhanced history buffer; and stream the stored portion of the second content program event out from the enhanced history buffer in response to detecting the program event change, wherein the second program content event is then presented to the user of the media device.

16. The media device of claim 15, wherein the processor system is further configured to:

detect a second program event change corresponding to a change from the second program event; and end the storing of the portion of the second program event in response to detecting the second program event change, wherein a second end boundary marker that identifies a known second end location in the enhanced history buffer is added into the second discrete program content file.

17. A media device that presents broadcasting program events to a user, comprising:
   a program content interface that receives at least a broadcast of a first program event and a second program event;
   an enhanced history buffer; and
   a processor system that is configured to:
      store a portion of the first program event in a first discrete program content file of the enhanced history buffer, wherein the first discrete program content file begins with a first start boundary marker that identifies a known first start location in the enhanced history buffer;
      stream the stored portion of the first program event out from the enhanced history buffer, wherein the streaming portion of the first program event is then presented to the user of the media device;
      detect a program event change, wherein the program event change corresponds to a request from the user to a change presentation from the first program event to the second program event,
      add a boundary marker portion into the first discrete program content file that includes transition point location information that identifies a location in the enhanced history buffer corresponding to a presentation location of the first program event when the program event change was detected; and
      continue the storing of the first program event into the first discrete program content file after the boundary marker portion has been added into the first discrete program content file;
      store a portion of the second program event in a second discrete program content file of the enhanced history buffer in response to detecting the program event change, wherein the second discrete program content file begins with a second start boundary marker that identifies a known second start location in the enhanced history buffer; and
      stream the stored portion of the second content program event out from the enhanced history buffer in response to detecting the program event change, wherein the second program content event is then presented to the user of the media device.

18. The media device of claim 17, wherein the program event change is a first program event change, and wherein the processor system is further configured to:
   detect a second program event change, wherein the second program event change corresponds to a new request from the user to change presentation from the second program event to the first program event,
   wherein presentation of the first program event resumes at a presentation time that corresponds to the transition point location information that identifies the location in the enhanced history buffer corresponding to the presentation location of the first program event when the program event change was detected.

* * * * *